United States Patent
Carter et al.

[11] Patent Number: 6,048,580
[45] Date of Patent: Apr. 11, 2000

[54] FOULING RELEASE COATING FOR MARINE VESSELS AND METHOD OF APPLICATION

[75] Inventors: Brian K. Carter, Pinckney; Matthew L. Cates, Flint, both of Mich.

[73] Assignee: Excelda Manufacturing Company, Brighton, Mich.

[21] Appl. No.: 08/984,348

[22] Filed: Dec. 3, 1997

[51] Int. Cl.⁷ .................. B05D 1/02; B05D 1/36
[52] U.S. Cl. ............ 427/407.1; 427/387; 427/402; 427/421
[58] Field of Search .................... 427/387, 421, 427/402, 407.1

[56] References Cited

U.S. PATENT DOCUMENTS

| | | |
|---|---|---|
| Re. 29,072 | 12/1976 | Zondek . |
| 1,638,818 | 8/1927 | Atwood . |
| 2,865,702 | 12/1958 | Brunner . |
| 3,154,460 | 10/1964 | Graner et al. . |
| 3,591,443 | 7/1971 | Cox . |
| 4,080,190 | 3/1978 | Law et al. ................... 71/67 |
| 4,082,884 | 4/1978 | DeLong . |
| 4,609,574 | 9/1986 | Keryk et al. ............. 427/407.1 |
| 4,636,324 | 1/1987 | Murase et al. ............... 252/70 |
| 4,667,619 | 5/1987 | Nishida . |
| 4,861,670 | 8/1989 | Lampe et al. ............... 428/447 |
| 4,909,172 | 3/1990 | Hamby . |
| 5,192,603 | 3/1993 | Slater et al. ............... 428/217 |
| 5,449,553 | 9/1995 | Griffith ..................... 428/332 |
| 5,476,560 | 12/1995 | Jönsson . |
| 5,486,578 | 1/1996 | Carpenter, II et al. ........ 525/478 |
| 5,558,038 | 9/1996 | McNamara . |
| 5,578,381 | 11/1996 | Hamada et al. ............. 428/447 |
| 5,593,732 | 1/1997 | Griffith ..................... 427/407.1 |
| 5,691,019 | 11/1997 | Carroll et al. .............. 428/40.1 |

Primary Examiner—Shrive Beck
Assistant Examiner—Jennifer Calcagni
Attorney, Agent, or Firm—MacMillan, Sobanski & Todd, LLC

[57] ABSTRACT

A fouling release coating for marine vessels includes a first adhesive coating formed from a mixture of silicone elastomer and thinner and a second adhesive coating formed from a mixture of silicone elastomer, release additive, and thinner. When applied by spraying, the first adhesive coating is preferably formed from a mixture of approximately 60% silicone elastomer, approximately 20% hydrocarbon solvent, and approximately 20% silicone fluid. The second adhesive coating is preferably formed from a mixture of approximately 54% silicone elastomer, approximately 20% hydrocarbon solvent, approximately 20% silicone fluid, and approximately 6% release additive. A method for applying the fouling release coating to a marine vessel is also disclosed.

14 Claims, 2 Drawing Sheets

FOULING RELEASE COATING FOR MARINE VESSELS AND METHOD OF APPLICATION

BACKGROUND OF THE INVENTION

This invention relates in general to coatings for hulls of marine vessels. More specifically, this invention relates to a fouling release coating for hulls and other surfaces of marine vessels and a method of applying such a coating.

Marine biofouling is a well known phenomenon for marine vessels and other submerged structures. Soft fouling organisms, such as algae and slime, and hard fouling organisms, such as barnacles and polyps, attach and grow to submerged portions of ships, boats, freighters, and other marine structures. For ship and boat owners, fouling on the hull causes increased drag in the water, resulting in decreased speed and fuel efficiency, and increased operating expenses. For large ocean-going vessels, marine biofouling can increase fuel cost by more than one third in some instances.

Anti-fouling coatings have been applied to hulls and boat bottoms to combat fouling organisms. These coatings are formed as paints which contain high amounts of heavy metals such as copper. The heavy metal destroys the organisms, and the paint is designed to slough off over time, thereby dislodging the dead organisms. Due to the sloughing process, the paint must be repeatedly applied to the hull in order to maintain the anti-fouling characteristic.

Environmental concerns have resulted in governmental regulations restricting the use of certain active agents in anti-fouling coatings. In particular, active agents involving the use of copper, tin, and the like are in disfavor.

It is desirable to reduce the drag and deteriorating effects of biofouling on marine hulls. Furthermore, it is desirable to protect marine hulls from water damage.

SUMMARY OF THE INVENTION

This invention includes a fouling release coating for marine hulls and a method for applying such a coating. The coating can be used on marine vessels traveling in fresh water and/or salt water. The coating does not slough off and is designed to be long-lasting. As a vessel achieves a predetermined speed in the water, organisms on the hull are flushed off by the force of the passing water. This self-cleaning quality of the coating increases fuel efficiency and reduces cleaning costs. Furthermore, the coating acts as a water barrier.

In a preferred embodiment, a fouling release coating for marine vessels includes a first adhesive coating formed from a mixture of silicone elastomer and thinner and a second adhesive coating formed from a mixture of silicone elastomer, release additive, and thinner. When applied by spraying, the first adhesive coating is preferably formed from a mixture of approximately 60% silicone elastomer, approximately 20% hydrocarbon solvent, and approximately 20% silicone fluid. The second adhesive coating is preferably formed from a mixture of approximately 54% silicone elastomer, approximately 20% hydrocarbon solvent, approximately 20% silicone fluid, and approximately 6% release additive.

A preferred method for applying the fouling release coating includes a first step of preparing a surface to be coated by creating additional bonding sites. A second step involves applying a silane primer to the prepared surface. A third step involves applying a first layer of a silicone adhesive coating over the primer. A fourth step involves applying a second layer of a silicone adhesive coating having a release additive over the first layer. A fifth step involves curing the first and second layers.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
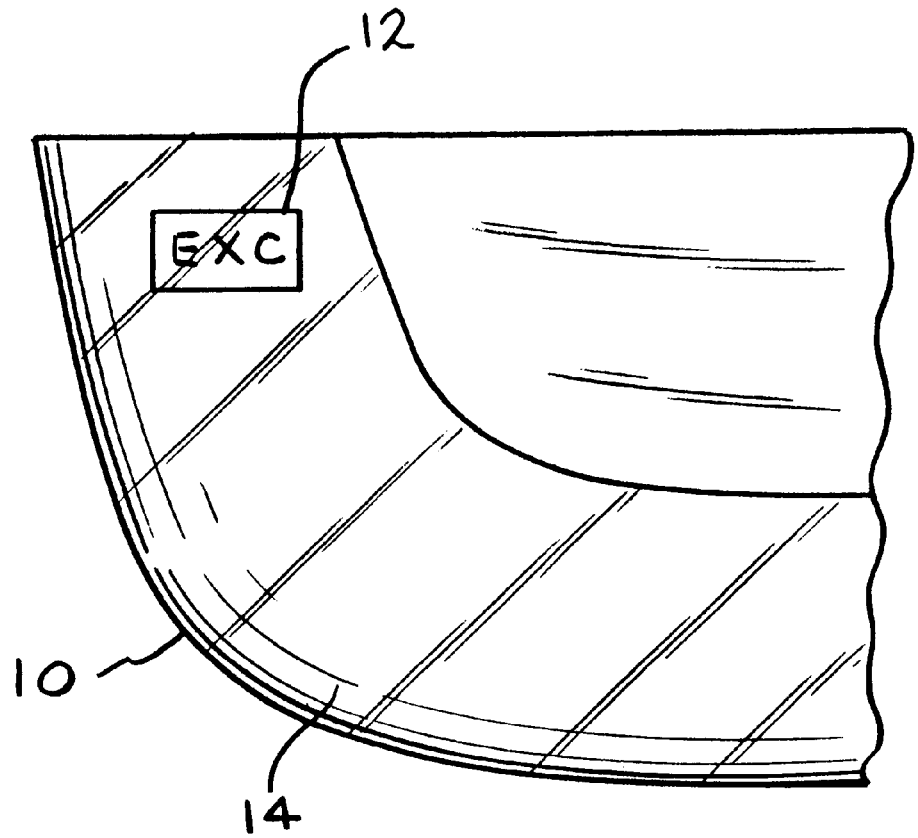
FIG. 1 is a schematic side view of a portion of a boat hull having a fouling release coating according to this invention.

A partial hull of a marine vessel is indicated generally at 10 in FIG. 1. The hull 10 can be formed from a variety of materials, including fiberglass, metal, and wood. When the vessel is placed in water, the hull 10 becomes partially submerged in a well known manner. Markings 12 are affixed to the hull 10 to identify and/or decorate the vessel. The markings 12 can be applied by decals, stickers, painting, etc.

A fouling release coating 14 is applied to a portion of the hull 10 in a method described below. The coating 14 is applied to at least that portion of the hull 10 which is expected to be submerged and exposed to water. While only a portion of the hull 10 of the example in FIG. 1 is coated, the entire hull of many vessels can include the coating 14, including the portion having markings 12. As described below in detail, the coating 14 causes organisms attached to the hull 10 to release when the vessel achieves a certain speed in the water. The coating 14 is clear and does not interfere with the markings 12. Furthermore, the coating 14 can be applied to other portions of a vessel.

Figure 2:
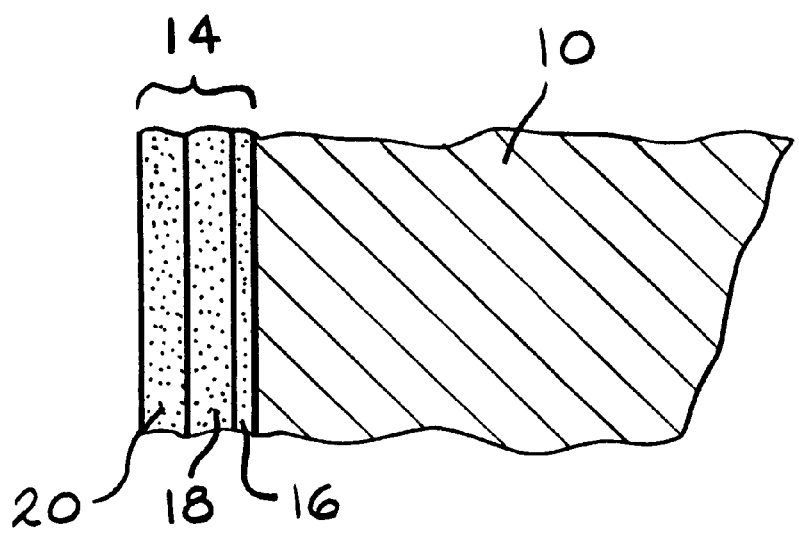
FIG. 2 is an enlarged sectional view of a portion of the hull of FIG. 1 wherein a primer and first and second layers of the coating according to this invention have been greatly enhanced for clarity of illustration.

As illustrated in FIG. 2, the coating 14 is preferably applied in two layers over a primer. A primer 16 is applied as a relatively thin layer to the outer surface of the hull 10. A first layer 18 is applied as a relatively thick layer to the outer surface of the primer 16. A second layer 20 is applied as a relatively thick layer to the outer surface of the first layer 18. The layers 18 and 20 are cured prior to placing the vessel in the water.

The primer 16 is applied to a prepared surface of the hull 10. The primer 16 promotes adhesion of the coating 14 to the hull 10 by creating sites for bonding between the primer 16 and the coating 14. Preferably, the primer 16 is a silane primer having a silicone reactive component which improves adhesion of silicone coatings. Also, the primer 16 is preferably clear and air-drying. Preferred, commercially-available products for primer 16 include Dow Corning 1204-P1204 Prime Coat and Dow Corning 1205-P1205 Prime Coat available from Dow Corning Corporation of Midland, Mich.

The first layer 18 is an adhesive coating applied to an outer surface of the primer 16. The first layer 18 is formed from a mixture of silicone elastomer and thinner. Preferably, the silicone elastomer is a room temperature-vulcanizing silicone rubber. Preferred, commercially-available products of silicone rubber include Dow Corning 3140 RTV Conformal Coating and Dow Corning 3145 RTV Conformal Coating available from Dow Corning Corporation of Midland, Mich. The Dow Corning 3140 and 3145 RTV Conformal Coatings are noncorrosive and clear materials.

Thinner is added to the silicone elastomer to reduce its viscosity. Preferably, the thinner is a mixture or blend of a hydrocarbon solvent and a silicone fluid. Preferably, the thinner blend is a mixture of approximately 40–60% hydrocarbon solvent and approximately 40–60% silicone fluid (measured in volume). A preferred hydrocarbon solvent is an isoparafinic solvent available under the brand name Isopar from Exxon Chemical. A preferred silicone fluid is a volatile siloxane fluid available as Dow Corning OS-20 Fluid from Dow Corning Corporation.

Preferably, the thinner blend is mixed with the silicone elastomer to form a mixture of approximately 40–60% silicone elastomer and approximately 40–60% thinner blend (measured in volume). The specific percentage for the mixture is dependent upon the type of application, namely spraying, rolling, brushing, etc. When the first layer 18 is applied by spraying, the first layer 18 is preferably formed from a liquid mixture containing 60% silicone elastomer, 20% hydrocarbon solvent, and 20% silicone fluid. When the first layer is applied by rolling or brushing, the mixture preferably contains less than 60% silicone elastomer and more than 40% thinner blend. Preferably, the first layer 18 is clear.

The second layer 20 is an adhesive coating formed from a mixture of silicone elastomer, release additive, and thinner. Preferred silicone elastomers include Dow Corning 3140 RTV Conformal Coating and Dow Corning 3145 RTV Conformal Coating. A preferred release additive is a silicone glycol copolymer available as Dow Corning 57 Additive from Dow Corning Corporation. A preferred thinner is formed as a blend or mixture of approximately 40–60% hydrocarbon solvent and approximately 40–60% silicone fluid. A preferred hydrocarbon solvent is an isoparafinic solvent available under the brand name Isopar from Exxon Chemical. A preferred silicon fluid is available as Dow Corning OS-20 Fluid from Dow Corning Corporation.

Initially, an intermediate mixture is made containing approximately 90% silicone elastomer and approximately 10% release additive (measured in volume). Next, a thinner blend is mixed with the intermediate mixture to form a preferred mixture of approximately 60% intermediate mixture and approximately 40% thinner (measured in volume) when the second layer is applied by spraying. Thus, the second layer 18 is preferably formed from a liquid mixture containing 54% silicone elastomer, 20% hydrocarbon solvent, 20% silicone fluid, and 6% release additive when the second layer is applied by spraying. When the second layer 18 is applied by rolling or brushing, less than 54% silicone elastomer is used and more than 40% thinner is used.

When a marine vessel having coating 14 reaches a speed of approximately 25 knots, marine organisms which may have attached themselves to the coating 14 are flushed off by the force of the passing water. The coating 14 does not prevent the attachment or growth of organisms. Instead, the coating 14 promotes the easy release of biofouling organisms so that the treated surface can be described as self-cleaning. This self-cleaning quality reduces drag of a vessel in the water, and thus improves speed and fuel efficiency. Furthermore, traditional cleaning costs are greatly diminished for a vessel with coating 14.

The coating 14 also acts as a water barrier for the treated surface. In particular, fiberglass has an affinity for water which can be absorbed and create acetic acid, resulting in blisters. A fiberglass boat having coating 14 is more resistant to such blisters. On a metal vessel, the coating 14 acts as a rust inhibitor. On a wooden vessel, the coating 14 protects the wood from water deterioration.

Figure 3:
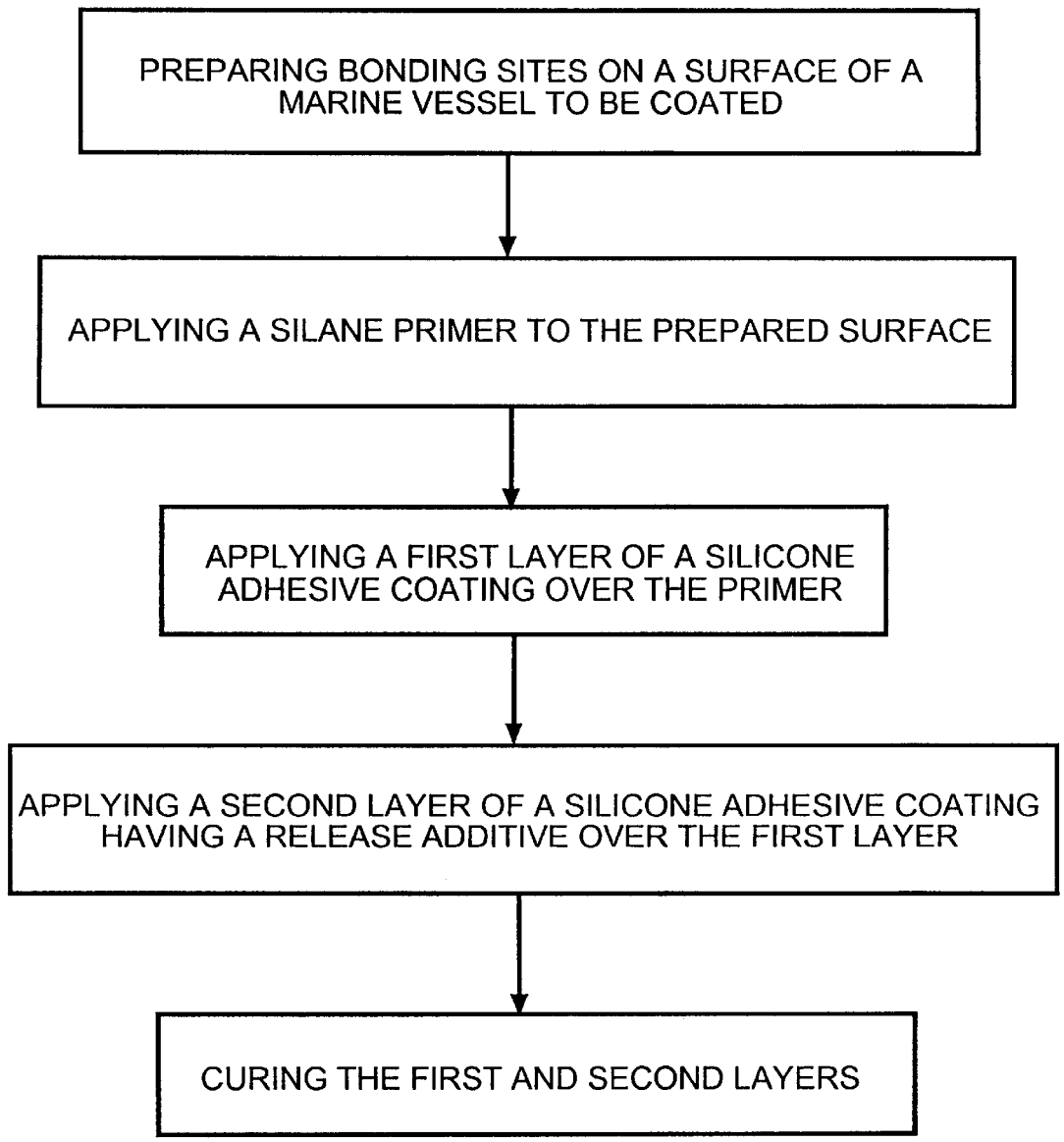
FIG. 3 is a flow chart of the steps of a method according to this invention for applying the fouling release coating illustrated in FIGS. 1 and 2.

A flow chart illustrating the preferred steps for applying the coating 14 is illustrated in FIG. 3. A five step method for applying the coating 14 is preferred.

A first step involves preparing the surface of a marine vessel to increase sites for molecular bonding. The surface which is to be coated should be lightly "roughed up" by any desired means. For example, a light sanding operation has been found suitable for gel-coated fiberglass boats. Sanding can involve wet or dry sanding using 300–600 grit sandpaper. After sanding, the surface should be cleaned. In a gel-coated fiberglass surface, sanding should eliminate a customary shine provided by the gel-coat. However, the operation should not sand through the gel-coat. Particular care should be taken to ensure edges are properly prepared. Other means can be used for other types of surfaces to prepare the surface. For example, sand blasting may be appropriate for some vessels, while acid etching may be appropriate for others, particularly metal hulls.

A second step involves applying the primer 16 to the prepared surface. The primer 16 promotes adhesion of the coating 14 to the prepared surface by creating sites for a molecular bond between the prepared surface and the coating 14. The prepared surface should be cleaned, preferably with a degreasing solvent such as naphtha, mineral spirits, xylene, or acetone. After the degreasing solvent has dried, a coat of primer 16 is applied to the prepared surface. The primer 16 can be applied by any suitable means. Preferably, the primer 16 is applied by spraying.

A third step involves applying the first layer 18 of the coating 14. As stated above, the first layer 18 is formed from a mixture of silicon elastomer and thinner blend. Preferably, the first layer 18 is applied immediately after the primer 16 has dried. Immediate application of the first layer 18 reduces accumulation of dust and dirt on the primer 16 which can inhibit bonding. The first layer 18 can be applied by any suitable means. Preferably, the first layer 18 is sprayed with an airless sprayer to form a relatively thick coat. A preferred thickness for the first layer 18 is approximately 6–8 mils. The first layer 18 should be allowed to cure approximately 30 minutes before applying the second layer 20. However, in larger vessels, the second layer 20 can be immediately applied due to the time required to apply the first layer 18.

A fourth step involves applying the second layer 20. As stated above, the second layer 20 is formed from a mixture of silicon elastomer, a reactive agent, and thinner blend. The second layer 20 can be applied by any desired means. Preferably, the second layer 20 is sprayed with an airless sprayer to form a relatively thick coat. A preferred thickness for the second layer 20 is approximately 6–8 mils. Thus, the coating 14 formed by layers 18 and 20 has a preferred thickness of 12–16 mils.

A fifth step involves curing the coating 14. The coating 14 is dried prior to placing the vessel in water. Preferably, the coating 14 is cured 24–48 hours, depending upon the ambient temperature and humidity.

The coating 14 can be applied at the time a marine vessel is manufactured or at a later date. The coating 14 is a long lasting material and does not slough off. As stated above, organisms will flush off the coating 14 once the vehicle reaches a speed of approximately 25 knots.

It is understood that the percentages discussed above can not exceed 100%. For example, as stated above, a preferred thinner blend is formed from a mixture of approximately 40–60% hydrocarbon solvent and approximately 40–60% silicone solvent. Thus, if approximately 45% hydrocarbon solvent is used, then approximately 55% of the mixture is silicone solvent.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method of applying a fouling release coating to a surface of a marine vessel comprising the steps of:

(a) preparing bonding sites on a surface to be coated;

(b) applying a silane primer to the prepared surface;

(c) applying a first layer of an silicone adhesive coating over the silane primer;

(d) applying a second layer of silicone adhesive coating having a release additive formed from a silicone glycol copolymer over the first layer; and (e) curing the first and second layers.

2. The method of applying a fouling release coating to a surface of a marine vessel defined in claim 1 wherein step (a) includes sanding the surface.

3. The method of applying a fouling release coating to a surface of a marine vessel defined in claim 1 wherein step (c) includes spraying the first layer from a mixture of approximately 60% silicone elastomer and approximately 40% thinner.

4. The method of applying a fouling release coating to a surface of a marine vessel defined in claim 1 wherein step (d) includes spraying the second layer from a mixture of approximately 54% silicone elastomer, approximately 40% thinner, and approximately 6% release additive.

5. The method of applying a fouling release coating to a surface of a marine vessel defined in claim 1 wherein each of steps (c) and (d) includes applying a layer to a thickness of approximately 6–8 mils.

6. A method of applying a fouling release coating to a marine surface comprising the steps of:

(a) applying a silane primer to a marine surface;

(b) applying a first layer of a silicone adhesive coating over the silane primer;

(c) applying a second layer of a silicone adhesive coating formed from a mixture of silicone elastomer, release additive formed from a silicone glycol copolymer, and thinner over the first layer; and (d) curing the first and second layers.

7. The method defined in claim 6 wherein the silicone adhesive coating used for the first layer is formed by mixing a silicone elastomer and a thinner.

8. The method defined in claim 7 wherein the thinner is formed by mixing approximately 40–60% hydrocarbon solvent and approximately 40–60% silicone fluid.

9. The method defined in claim 6 wherein the thinner in the mixture used for the second layer is formed by mixing approximately 40–60% hydrocarbon solvent and approximately 40–60% silicone fluid.

10. A method of applying a fouling release coating to a marine surface comprising the steps of:

(a) preparing a thinner containing a hydrocarbon solvent and a silicone fluid;

(b) mixing a silicone elastomer with the thinner to form a first liquid;

(c) preparing an intermediate mixture containing silicone elastomer and a release additive formed from a silicone glycol copolymer;

(d) mixing a thinner blend with the intermediate mixture to form a second liquid;

(e) applying a primer to a marine surface;

(f) applying a first layer using the first liquid over the primer;

(g) applying a second layer using the second liquid over the first layer; and (h) curing the first and second layers.

11. The method defined in claim 10 wherein the intermediate mixture contains approximately 90% silicone elastomer and approximately 10% release additive.

12. The method defined in claim 11 wherein the second liquid is formed of approximately 60% intermediate mixture and approximately 40% thinner.

13. The method defined in claim 11 wherein each of the first and second layers has a thickness greater than a thickness of the primer.

14. The method defined in claim 11 wherein the primer and first and second layers are clear.

* * * * *